(No Model.)
J. A. MAILLOUX.
CAMERA.
No. 427,778. Patented May 13, 1890.
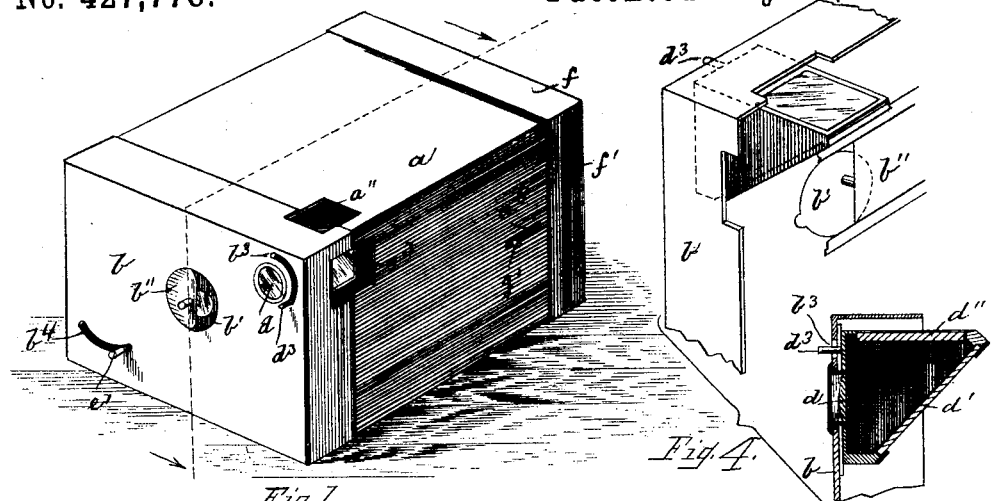
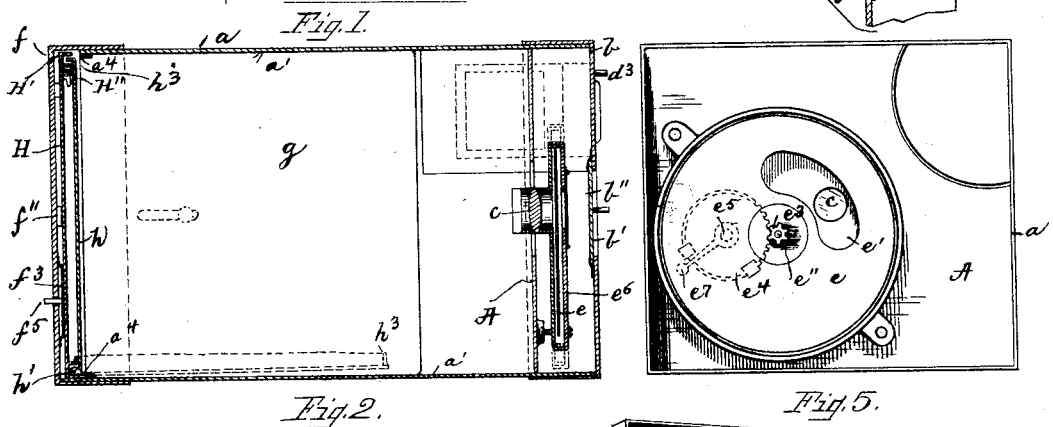
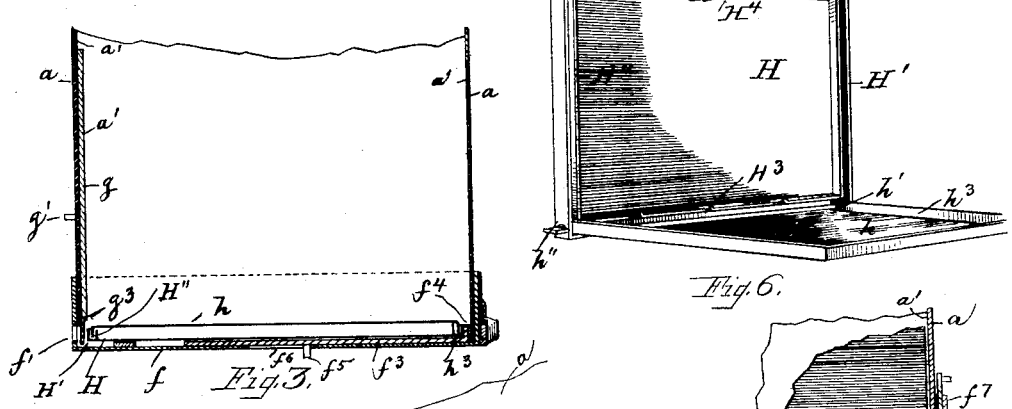
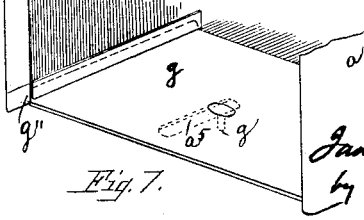
Witnesses
Inventor
James A. Mailloux

UNITED STATES PATENT OFFICE.

JAMES A. MAILLOUX, OF BROOKLINE, MASSACHUSETTS.

CAMERA.

SPECIFICATION forming part of Letters Patent No. 427,778, dated May 13, 1890.

Application filed August 14, 1889. Serial No. 320,736. (No model.)

*To all whom it may concern:*

Be it known that I, JAMES A. MAILLOUX, a citizen of the United States, and a resident of Brookline, in the county of Norfolk and State of Massachusetts, have invented new and useful Improvements in Cameras, of which the following, taken in connection with the accompanying drawings, is a specification.

This invention relates to cameras; and it is carried out as follows, reference being had to the accompanying drawings, wherein—

Figure 1 represents a perspective view of the improved camera. Fig. 2 represents a central longitudinal section showing the plate-holder inserted in it and showing in dotted lines the said plate-holder open. Fig. 3 represents a horizontal section of the rear portion of the camera, showing the plate-holder and device for pushing the latter out of the camera after its plate has been exposed. Fig. 4 represents a detail sectional view of the finder and also a perspective view thereof. Fig. 5 represents an end view of the shutter with its cap shown as removed.
Fig. 6 represents a perspective view of the plate-holder in an open position. Fig. 7 represents a detail perspective view of the slide for closing the opening through which the plate-holder is inserted into the camera, and Fig. 8 represents a detail view of the crank and socket by means of which the plate-holder is opened and closed while in the camera.

Similar letters refer to similar parts wherever they occur on the different parts of the drawings.

$a$ is the camera-box, which is made of thin sheet metal, so as to be as tight as possible consistent with strength. The said box is preferably provided on its inside with a cloth or equivalent lining $a'$, which serves to absorb moisture, and prevents the latter from evaporation and condensation on the lens. The outside of the camera-box is likewise provided with a cloth or other lining; or it may be japanned or painted, if so desired.

$b$ is the forward end of the camera-box, which is preferably made flanged and detachable from the box $a$, as shown in Fig. 2.

$b'$ is a central perforation in the part $b$, which is adapted to be closed by the slide $b''$, as is common in cameras of this kind.

A is a diaphragm or partition secured within the box $a$ a short distance back of the front $b$, and $c$ is the lens secured in a suitable manner to such diaphragm or partition.

To the front $b$ is journaled the finder, composed of lens $d$, reflector $d'$, and ground glass $d''$, said finder being adapted to be turned at a right angle to enable the box to be used for taking horizontal or vertical pictures, as may be desired, and in connection with such oscillating finder I make on top and side of the box $a$ the perforations $a''$ and $a^3$ near one of its corners, through which the object may be seen that is reflected on the ground glass of said finder. The finder may be turned by means of a pin $d^3$ projecting through a curved slot $b^3$ in the forward end $b$. The shutter is composed of a circular disk $e$, having, preferably, an elongated perforation $e'$, coinciding with the lens $c$. The disk $e$ is journaled centrally on a pin $e''$, and to such pin is secured the small pinion $e^3$, the teeth of which mesh into the teeth of the gear $e^4$, secured to a shaft or pin $e^5$, journaled in the cover $e^6$, which shaft is provided with a crank $e^7$, projecting through a curved slot $b^4$ in the forward end of the camera-box, as shown. It will thus be seen that by turning the gear $e^4$ a part of a revolution a quick rotary motion is imparted to the perforated disk $e$, causing an instantaneous exposure of the lens $c$ and the plate in the plate-holder. By moving the crank $e^7$ with more or less rapidity the exposure may be regulated according to the sensitiveness of the plate, the quickness of the lens, or the color of the object that is to be taken.

$f$ is the flanged rear cover for the camera-box, which is preferably made detachable from the latter and adapted to fit over the end of the camera-box, as shown. Said cover has in one of its flanged sides a slot $f'$, through which the plate-holder is introduced into the camera.

$f''$ is a spring on the inside of the cover $f$, which serves to press and hold the front edge of the plate-holder against the projecting ledges or offsets $a^4$ in the interior rear portion of the camera-box, as shown.

Inside of the cover $f$ is arranged a slide $f^3$, having an angular lip $f^4$, which slide serves for the purpose of pushing out the plate-holder through the slot $f'$ sufficiently to enable the operator to take hold of it and draw it out by hand after the plate has been exposed. The said slide is for this purpose provided with a knob or projection $f^5$ passing loosely through a slot $f^6$ in the cover $f$, as shown.

It is essential that the slot $f'$ should be properly closed after the plate-holder has been introduced into the camera, so as to exclude all light at this place, and for this purpose I arrange on the inside of the camera, opposite such slot $f'$, a slide $g$, having a knob or projection $g'$ extending through a slot $a^5$ in the side of the camera-box, as shown, by means of which said slide can be pushed forward and back to close and open the slot $f'$. For the purpose of preventing leakage of light at the upper and lower edges of said slide, I provide such parts with thin inwardly-projecting lips $g''$ $g''$. The slide $g$ has on its inside a ledge or projection $g^3$, corresponding to the internal stationary ledges $a^4$ on the inside of the rear part of the camera, and for the same purpose. The slide $g$ is provided on its inside with a cloth or equivalent moisture-absorbent lining $a'$, similar to the one described in the interior of the camera-box.

The plate-holder is made entirely of metal and is composed of two plates H and $h$, of which the former is the plate-holder and the latter is the cover. Said parts are pivoted together in their lower edges by means of a pin $h'$, secured to the cover $h$ and journaled in the flanges of the holder H. Said pin $h'$ extends in one end beyond the holder H, in the form of a flattened, square, or polygonal projection $h''$, by means of which and a lever hereinafter to be described the cover $h$ is opened and closed while the holder is in the camera.

The holder H has at its outer edges the angular continuous flange rib or lip H', and inside of the same a similar continuous rib or lip H'', between which a similar continuous rib or lip $h^3$ on the cover $h$ is made to project when the plate-holder is closed, and in this manner the device is made absolutely light-tight. The sensitive plate is temporarily secured within the holder H by having one of its sides or ends inserted below suitable projections H³, and having its opposite side or end held in position by means of a suitable spring H⁴, one end of which is secured in a suitable manner to the holder and the free end of said spring adapted to lock and hold the plate in position within the said holder, for the purpose set forth.

On the outside of the cover $f$ is pivoted at its lower edge a lever or handle $f^7$, the hub of which is provided with a recess or perforation $f^8$, corresponding in shape to and adapted to receive the hinge-pin end $h''$ of the plate-holder cover when the plate-holder is inserted within the camera-box.

The operation is as follows: The plate-holders are filled in a dark room, as usual, after which one of the filled holders is inserted through the slot $f'$ and the hinge-pin projection $h''$ of the holder inserted in the recess $f^8$ of the lever $f^7$, as described. The opening $f'$ is then closed by the slide $g$, as described. The safety-shutter $b''$ is then opened. I now open the plate-holder by swinging the lever $f^7$, and with it the plate-holder cover $h$, from a vertical to a horizontal position, causing the plate to be exposed to the interior of the camera. When the object has been found on the finder, I expose the plate by turning the cranks $e^7$ at the front end of the camera from one end to the other of the curved slot $b^4$, causing the lens to be momentarily exposed and as quickly closed. After the plate has been thus exposed, I close the plate-holder by turning the lever $f^7$, and with it the plate-holder cover $h$, from a horizontal to a vertical position, causing the plate-holder to be effectually closed. I now withdraw the slide $g$, leaving the slot $f'$ open. The now closed plate-holder is then partially pushed out of the slot $f'$ by means of the pusher-slide $f^3$ $f^4$, and finally drawn out by hand from said slot $f'$, after which the plate may be developed as usual. Another loaded plate-holder is then inserted within the camera, and so on.

Having thus fully described the nature, construction, and operation of my invention, I wish to secure by Letters Patent, and claim—

1. In a camera, an oscillating finder journaled at the front end of said camera and adapted to be turned around the lens-axis to two positions, one at a right angle to the other, substantially as and for the purpose set forth.

2. The camera-box $a$ and the side slot $f'$, near its rear end, for receiving the plate-holder, combined with the slide $g$ and its lips $g''$ and knob $g'$ for its operation, substantially as and for the purpose set forth.

3. In a camera, the box $a$ and its side slot $f'$, combined with the slide $f^3$ and lip $f^4$, and knob $f^5$, projecting through a slot at the rear end of the camera for the purpose of aiding in the removal of the plate-holder, substantially as specified.

4. In a camera, the box $a$ and its internal rear ledges $a^4$, combined with the rear cover or end $f$ and its spring $f'''$, for the purpose of holding the plate-holder in position, in a manner as set forth.

5. The folding metal plate-holder, as described, consisting of the ribbed parts H and $h$, pivoted together by means of a pin $h'$, having a projecting end $h''$, combined with a lever $f^7$, pivoted to the camera-box and having a recessed hub adapted to receive the projecting end of the hinge-pin of the plate-holder cover, substantially as and for the purpose set forth.

In testimony whereof I have signed my name to this specification, in the presence of two subscribing witnesses, on this 7th day of August, A. D. 1889.

JAMES A. MAILLOUX.

Witnesses:
ALBAN ANDRÉN,
ROBT. N. RICHMOND.